(12) United States Patent
Tessicini et al.

(10) Patent No.: US 12,492,114 B2
(45) Date of Patent: Dec. 9, 2025

(54) CARBONATION DEVICE FOR BEVERAGES AND RELATED CARBONATION SENSOR

(71) Applicant: FLUID-O-TECH S.R.L., Corsico (IT)

(72) Inventors: Fabrizio Tessicini, Imola (IT); Michele Norgia, Milan (IT); Diego Andreis, Milan (IT)

(73) Assignee: FLUID-O-TECH S.R.L., Corsico (IT)

(*) Notice: Subject to any disclaimer, the term of this patent is extended or adjusted under 35 U.S.C. 154(b) by 1312 days.

(21) Appl. No.: 16/943,575

(22) Filed: Jul. 30, 2020

(65) Prior Publication Data

US 2021/0032087 A1     Feb. 4, 2021

(30) Foreign Application Priority Data

Aug. 1, 2019  (IT) .................. 102019000013644

(51) Int. Cl.
*B67D 1/00*  (2006.01)
*B01F 23/236*  (2022.01)
(Continued)

(52) U.S. Cl.
CPC ........ *B67D 1/0074* (2013.01); *B01F 23/2363* (2022.01); *B01F 35/2132* (2022.01);
(Continued)

(58) Field of Classification Search
CPC ...... G01N 21/51; G01N 21/53; G01N 21/532; B01F 23/2363; B01F 35/2211;
(Continued)

(56) References Cited

U.S. PATENT DOCUMENTS 5,178,799 A  *  1/1993  Brown ................ B01F 35/2209
                                                    261/DIG. 7
5,680,111 A     10/1997  Danby et al.
(Continued)

FOREIGN PATENT DOCUMENTS

EP      3278072 A1    2/2018
WO   2016161091 A1   10/2016

OTHER PUBLICATIONS

Hepworth, N. J., J. R. M. Hammond, and J. Varley. "Novel application of computer vision to determine bubble size distributions in beer." Journal of food engineering 61.1 (2004): 119-124. (Year: 2004).*

(Continued)

*Primary Examiner* — Elizabeth M Kerr
*Assistant Examiner* — Simpson A Chen
(74) *Attorney, Agent, or Firm* — CANTOR COLBURN LLP

(57) ABSTRACT

A carbonation device for beverages includes a carbonation tank to receive a beverage to be carbonated and carbon dioxide so as to generate a carbonated beverage, carbonated with the carbon dioxide, and a dispensing device in fluid communication with the carbonation tank to dispense, through a duct, the carbonated beverage to a container for carbonated beverages, the carbonated beverage flowing along the duct in a flow direction.

The carbonation device further includes a carbonation sensor associated with the duct and having a radiation source to generate a radiation which strikes the duct along an irradiation direction incident to the flow direction.

The carbonation sensor also includes a first photodiode placed on the irradiation direction from a side opposite to the radiation source with respect to the duct, or as an alternative, (Continued)

a second photodiode placed along a diffusion direction substantially orthogonal to the irradiation direction.

9 Claims, 6 Drawing Sheets

(51) Int. Cl.
  *B01F 35/21* (2022.01)
  *B01F 35/221* (2022.01)
  *B67D 1/08* (2006.01)
  *G01N 21/51* (2006.01)
  *G01N 21/53* (2006.01)

(52) U.S. Cl.
  CPC .......... *B01F 35/2211* (2022.01); *B67D 1/006* (2013.01); *B67D 1/0888* (2013.01); *G01N 21/51* (2013.01); *G01N 21/532* (2013.01)

(58) Field of Classification Search
  CPC . B01F 35/2132; B67D 1/0074; B67D 1/0075; B67D 1/0076; B67D 1/0057; B67D 1/006; B67D 1/0888
  USPC ........................................................ 99/323.1
  See application file for complete search history.

(56) References Cited

U.S. PATENT DOCUMENTS

| | | | |
|---|---|---|---|
| 2009/0050809 A1* | 2/2009 | Holec | G01F 1/7086 250/343 |
| 2009/0258120 A1* | 10/2009 | Zeitler | B67D 1/0884 222/105 |
| 2012/0004865 A1* | 1/2012 | Porro | G01S 17/58 356/28.5 |
| 2012/0228328 A1* | 9/2012 | Ryan | B67D 1/0043 222/129.4 |
| 2013/0037973 A1* | 2/2013 | Lavaque | B01F 23/2362 261/27 |
| 2016/0304820 A1 | 10/2016 | Osborn | |
| 2017/0120204 A1* | 5/2017 | Tipton | A23L 2/54 |
| 2017/0121165 A1* | 5/2017 | Gabrieli | B67D 1/0884 |
| 2017/0156366 A1* | 6/2017 | Topp | A23G 9/22 |
| 2017/0370896 A1* | 12/2017 | Arifin | G01N 21/359 |

OTHER PUBLICATIONS

Paul M. Wise et al. "The Influence of Bubbles on the Perception Carbonation Bite", PLoS One, Aug. 2013, vol. 8, Iss. 8, pp. 1-9, www.plosone.org.

* cited by examiner

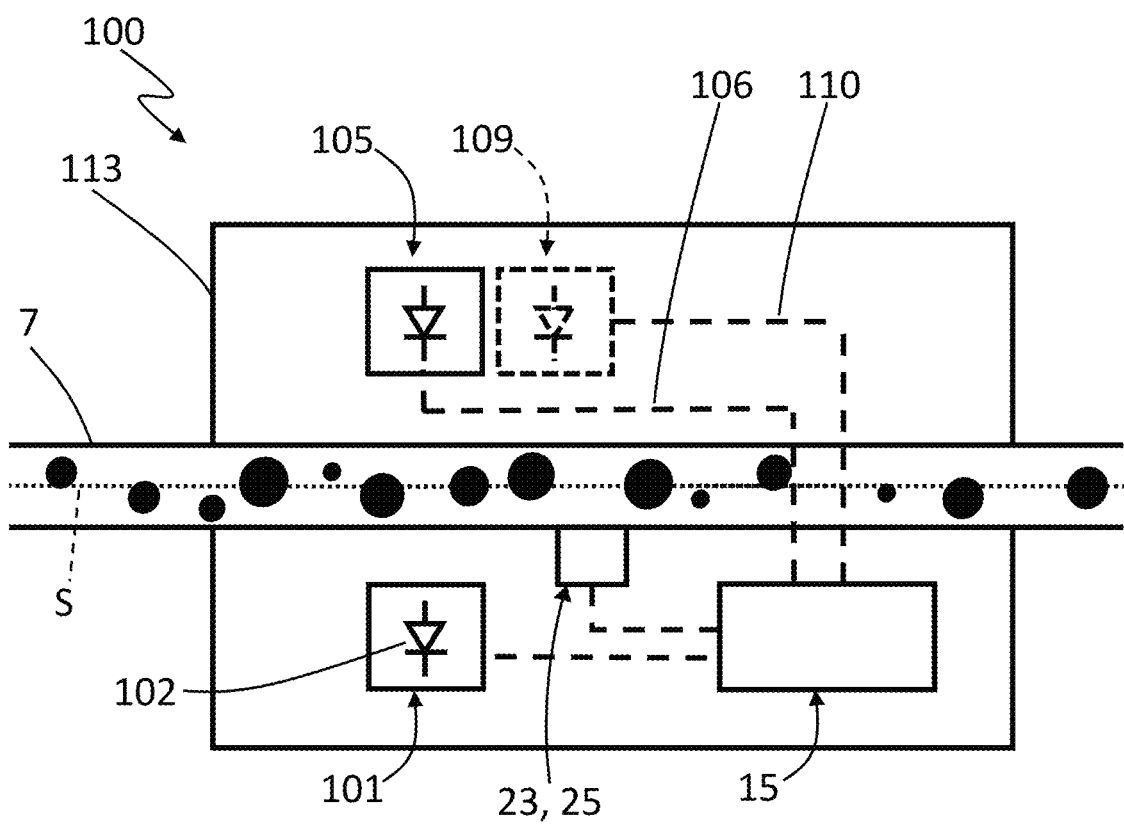
Fig. 4
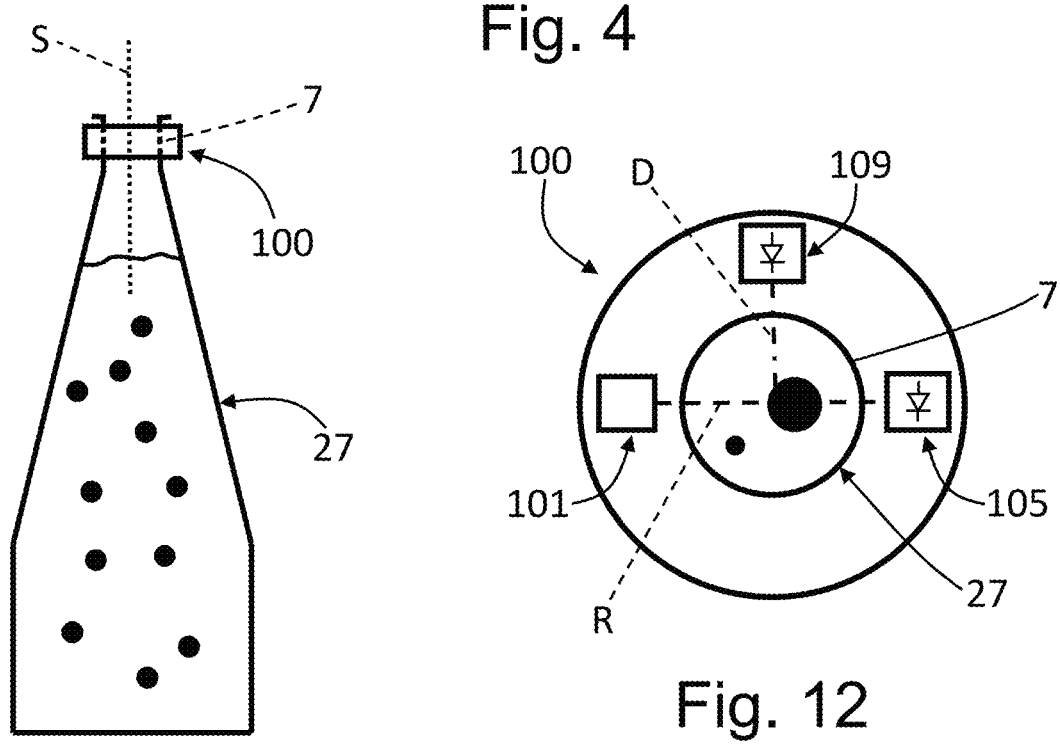
Fig. 11
Fig. 12

CARBONATION DEVICE FOR BEVERAGES AND RELATED CARBONATION SENSOR

CROSS-REFERENCE TO RELATED APPLICATIONS

This application is related to, and claims the benefit of Italian Patent Application No. 102019000013644, filed on Aug. 1, 2019, the contents of which are herein incorporated by reference in their entirety.

TECHNICAL FIELD

The present disclosure relates to a carbonation device for beverages and to a carbonation sensor with which such a device can be equipped.

BACKGROUND

As is known, carbonation is the process of adding carbon dioxide in the preparation of carbonated beverages or carbonated water, but also of alcoholic beverages which provide for the addition of carbon dioxide, such as for example some types of beers.

Carbon dioxide is a fundamental ingredient of carbonated beverages, as it contributes to defining many properties of a carbonated beverage, such as the taste and aroma of the beverage, but also, as a result of the formation of carbon dioxide bubbles, the visual appeal and tactile sensation on the tongue and palate.

In fact, it has been demonstrated that all the aforementioned properties of carbonated beverages are not simply due to the presence of carbon dioxide dissolved in the beverage, but are enhanced by the carbon dioxide bubbles that form in the beverage at atmospheric pressure (see article "The influence of Bubbles on the Perception Carbonation Bite" by Wise, Wolf, Thom and Bryant).

The carbonation devices for beverages of the known type generally comprise a carbonation tank, or in any case a volume, where the beverage to be carbonated is contacted with carbon dioxide under pressure. Carbonation devices are present both in large industrial beverage bottling lines and in the so-called carbonated beverage dispensers, which are found in restaurants, fast food restaurants, bars, pubs, in the so-called "water houses", but also in offices and companies.

Generally the carbonation devices of the known type provide that the beverage to be carbonated is pressurized by means of a pump and injected into the carbonation tank, or in the volume, through a nozzle which allows the beverage itself to atomise, so as to offer the greatest possible contact surface with the carbon dioxide present in the tank itself, so as to maximize the absorption of carbon dioxide by the beverage to be carbonated.

As is known, there are several factors that significantly affect the carbonation degree of a beverage:

Time factor: the greater the contact time of a beverage with carbon dioxide under pressure, the greater the amount of carbon dioxide that is absorbed by the beverage, until saturation. On the contrary, the greater the time during which a carbonated beverage is kept at room pressure, the greater the amount of carbon dioxide that is released from the carbonated beverage, also through the formation of bubbles;

Pressure factor: the higher the pressure of carbon dioxide in contact with the beverage, the greater the amount of carbon dioxide that is absorbed by the beverage, until saturation;

Temperature factor: the lower the temperature of the beverage, the higher the speed with which carbon dioxide is absorbed by the beverage, until saturation. Furthermore, the lower the temperature of the carbonated beverage, the longer the carbon dioxide remains in the carbonated beverage;

Stirring factor: the stirring of the carbonated beverage accelerates the process of release of carbon dioxide from the carbonated beverage that occurs when the beverage is placed under atmospheric pressure conditions;

Acidity factor: different pH levels of the beverage lead to different carbonation degrees of the same;

Quality factor: particles suspended in the carbonated beverage, even microscopic in size, behave like tiny centres of instability which cause a loss of carbonation.

Said factors entail technical difficulties in controlling and maintaining the desired carbonation degree of a beverage, both in industrial and non-industrial processes.

Carbonation devices of the known type generally do not comprise sensors capable of detecting the carbonation degree of the dispensed beverage. In fact, the amount of carbon dioxide dissolved in a beverage is generally set by regulating the pressure of the carbon dioxide which is placed in contact with the beverage to be carbonated inside the carbonation tank, or the volume, according to the physical principle of the solubility of gases in a liquid, described by Henry's law.

This approach obviously does not take into account the fact that the carbonation degree of a carbonated beverage also depends significantly on what happens to the carbonated beverage in the dispensing circuit downstream of the carbonation tank, for example as a result of the contact of the carbonated beverage with the walls of the ducts through which it flows, or as a result of the pressure variations to which the carbonated beverage is subjected during the passage along said ducts.

The carbonation degree of a beverage can be measured with different methods, among which the "multiple volume expansion method" invented by Anton Paar can be mentioned, which provides for measuring pressure and temperature of a beverage contained within a measuring volume which is expanded, to then obtain the concentration of carbon dioxide dissolved in the beverage. Other methods for measuring the carbonation degree are based on the measurement of the conductivity of the carbonated beverage so as to obtain the carbon dioxide concentration thereof.

There are also thermal sensors which, based on the principle that each gas has a specific thermal conductivity, are able to estimate, starting from differential temperature measurements, the partial pressure of the carbon dioxide which is diffused, through a special membrane immersed in the liquid, in a measurement volume. Through Henry's law, the carbon dioxide concentration can be obtained from the partial pressure of carbon dioxide.

Known methods for measuring the concentration of carbon dioxide, however, require elaborate and complex procedures, as well as expensive equipment, and are therefore not applicable for performing on-line measurements on carbonation devices. Furthermore, known sensors of carbon dioxide dissolved in a liquid, such as the thermal sensors mentioned above, are very delicate as well as very expensive sensors. Furthermore, the diffusion membranes they must necessarily use have a very short life.

For this reason, said methods and sensors are generally not used in carbonation devices of the known type for the on-line measurement of the carbonation degree of a carbonated beverage.

Furthermore, whether use is made of an estimate of the dioxide dissolved in a beverage by knowing the partial pressure of carbon dioxide and Henry's law or use is made of the aforementioned sensors of carbon dioxide dissolved in a liquid, the only one possibly known parameter is the concentration of carbon dioxide dissolved in the carbonated beverage.

To date, in fact, it is not possible to obtain information on how carbon dioxide dissolved in the liquid contributes to the formation of bubbles when the carbonated beverage is placed at environmental pressure.

In particular, to date it is not possible to detect the presence of bubbles when dispensing a carbonated beverage, let alone their size.

As mentioned above, however, carbon dioxide bubbles contribute significantly to determining the perception of the properties of the carbonated beverage.

SUMMARY

The main task of the present disclosure provides a carbonation device for beverages which obviates the drawbacks and overcomes the limits of the prior art by allowing the carbonation degree and quality (understood as perception on the palate and estimation of the duration of persistence of $CO_2$ in the beverage) of a beverage to be measured in a robust, economic and continuous way.

Within the scope of this task, the present disclosure provides a carbonation device which allows to regulate the carbonation degree of the beverage on the basis of measures of the carbonation degree of the beverage itself.

The disclosure provides a carbonation device for beverages which allows to obtain information on the presence and the type of bubbles in the beverage, in order also to guarantee a stability and a repeatability of the recipe of the carbonated beverage, at least with reference to the desired carbonation degree.

In fact, as explained in the introductory part, since the perception of the properties of carbonated beverages is strongly influenced by the presence and the type of bubbles, knowing, and possibly regulating, the amount and size of the bubbles that are generated in a carbonated beverage when placed at ambient pressure is very important for obtaining beverages having the desired properties.

The disclosure provides a carbonation device for beverages which is easy to manufacture and economically competitive when compared to the prior art.

The aforementioned task, as well as the aforementioned and other advantages which will become better apparent hereinafter, are achieved by providing a carbonation device for beverages as well as by a carbonation sensor for a carbonation device for beverages as recited in the claims.

Other features are envisaged in the dependent claims.

BRIEF DESCRIPTION OF THE DRAWINGS

Further characteristics and advantages will become apparent from the description of a preferred but not exclusive embodiment of a carbonation device for beverages, illustrated only by way of non-limitative example with the aid of the accompanying drawings, in which:

FIG. 4 is a schematic view of the carbonation sensor present in the carbonation device, according to the disclosure;

FIG. 11 schematically illustrates a variant of a carbonation sensor, according to the disclosure, applied to the neck of a bottle; and FIG. 12 schematically shows the carbonation sensor of FIG. 11, in a top view.

DETAILED DESCRIPTION OF THE DRAWINGS

Figure 1:
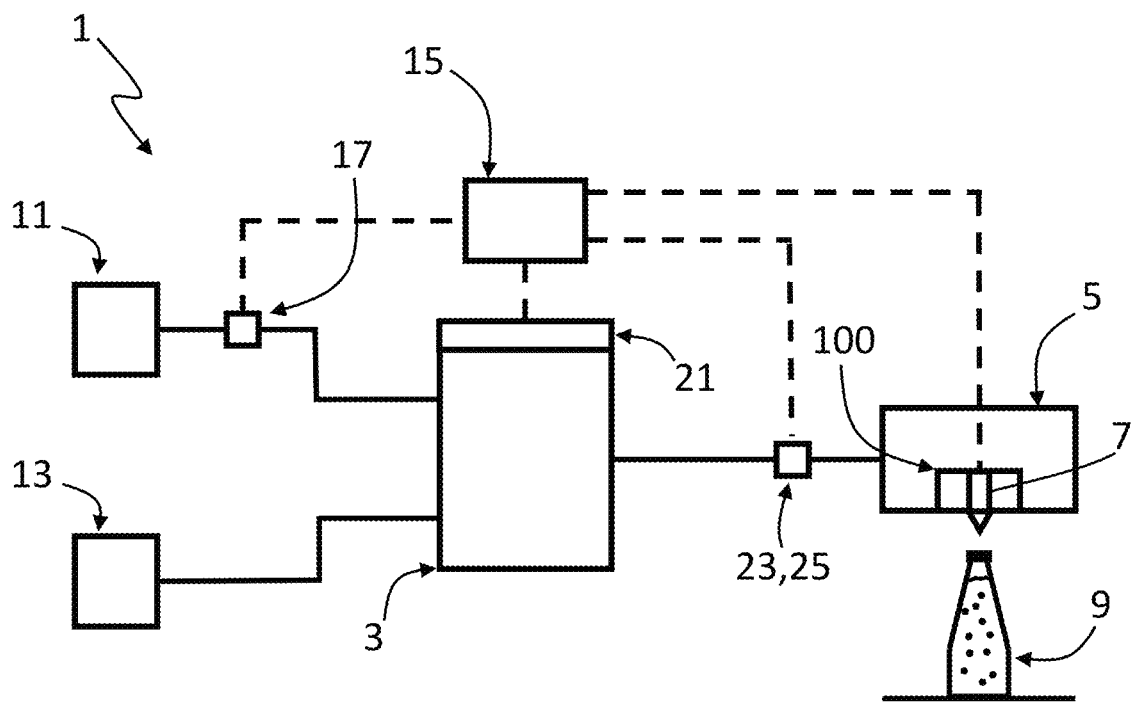
FIG. 1 is a schematic view of an embodiment of a carbonation device for beverages, according to the disclosure.
Figure 2:
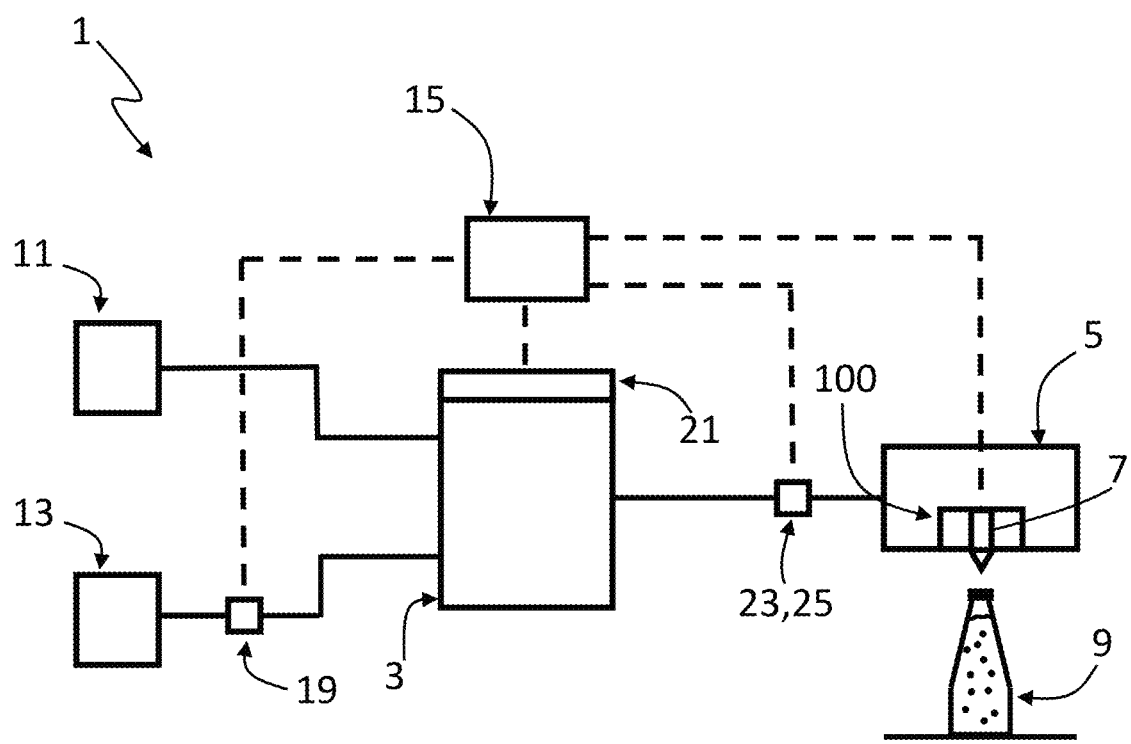
FIG. 2 is a schematic view of a variant of the carbonation device of FIG. 1, according to the disclosure.

With reference to the aforementioned figures, the carbonation device for beverages, indicated globally with the reference number 1, comprises a carbonation tank 3 adapted to receive at the inlet a beverage to be carbonated and carbon dioxide, so as to generate a carbonated beverage with said carbon dioxide.

The term carbonation tank generally means a carbonation volume where the beverage to be carbonated comes into contact with carbon dioxide so as to be added with carbon dioxide.

The carbonation tank may therefore be a closed container containing the beverage to be carbonated and carbon dioxide under pressure, or an open duct where the carbon dioxide under pressure is continuously introduced into the beverage to be carbonated while it is flowing.

Since the beverage to be carbonated can comprise several ingredients, such as for example water and one or more syrups, the term "beverage to be carbonated" also means mixtures of liquids.

The carbonation device 1 further comprises a dispensing device 5, in fluid communication with the aforesaid carbonation tank 3, adapted to dispense, through a duct 7, the carbonated beverage to a container 9 for carbonated beverages.

Figure 3:
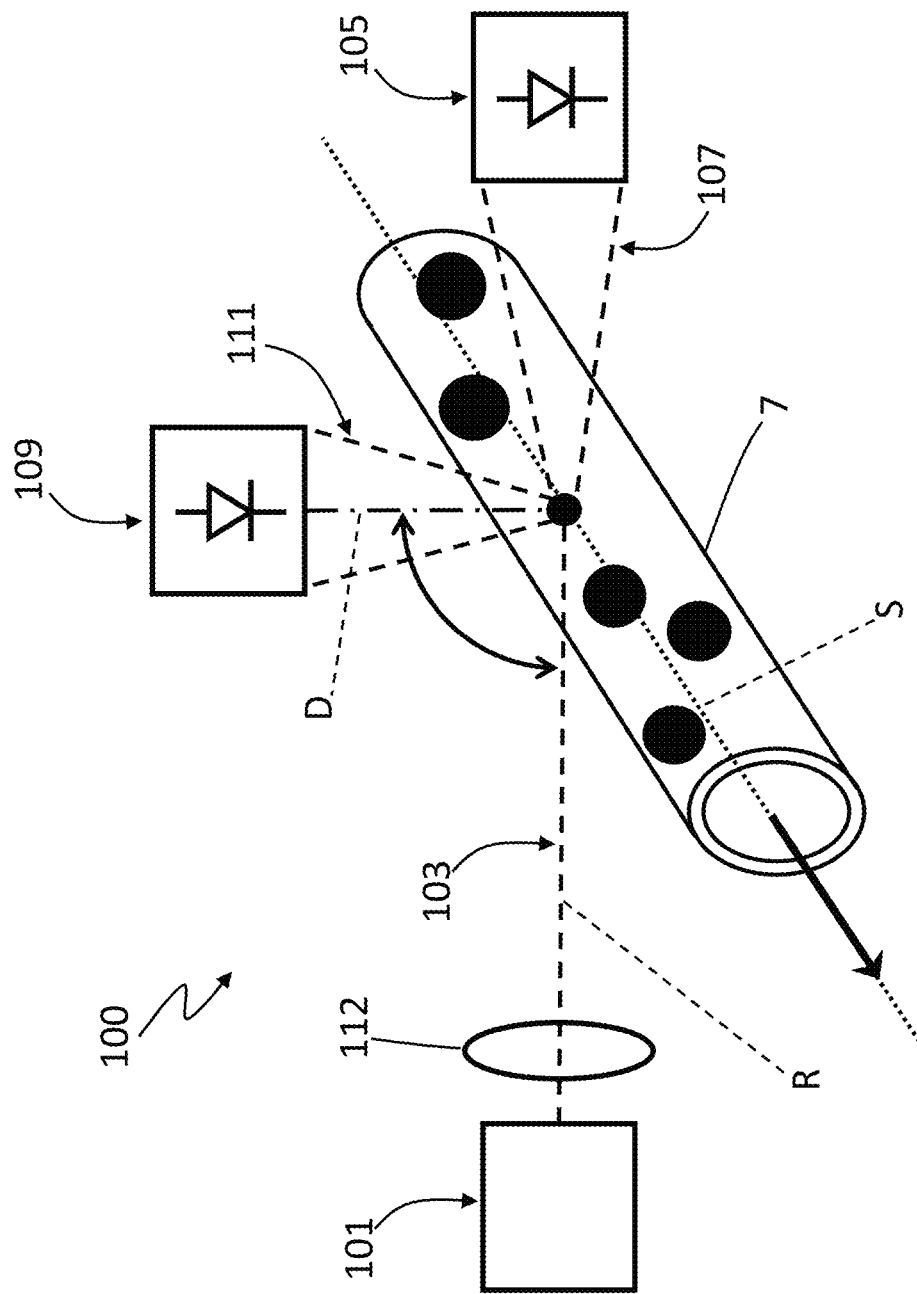
FIG. 3 schematically illustrates the operating principle of a carbonation sensor present in the carbonation device, according to the disclosure.

The carbonated beverage flows along the duct 7 according to a flow direction indicated by S in FIGS. 3 and 4.

The container 9 for carbonated beverages can be, for example, a bottle, in the case of industrial lines for bottling carbonated beverages, or a glass in the case of non-industrial dispensers.

According to the disclosure, the carbonation device 1 comprises a carbonation sensor 100 associated with the duct 7. Said carbonation sensor 100 comprises a radiation source 101 adapted to generate a radiation 103 which strikes the duct 7 along an irradiation direction R incident to said flow direction S.

According to the disclosure, the carbonation sensor 100 comprises:

- a first photodiode 105 placed on said irradiation direction R from a side opposite to the radiation source 101 with respect to the duct 7, said first photodiode 105 generating a first electrical signal 106 dependent on the radiation portion 107 which passes through the carbonated beverage which flows along said duct 7, or, as an alternative to said first photodiode 105;
- a second photodiode 109 placed along a diffusion direction D substantially orthogonal to the irradiation direction R, said second photodiode 109 generating a second electrical signal 110 dependent on the radiation portion 111 which is diffused by the carbonated beverage along substantially said diffusion direction D.

Preferably the carbonation sensor 100 comprises both the first photodiode 105 and the second photodiode 109.

The expression "flow direction S" means the direction along which the carbonated beverage flows inside the duct 7, with particular reference to the portion of the duct 7 which is struck by the radiation 103 emitted by the radiation source 101. In the case in which the duct 7, in the portion of the same which is struck by the radiation 103, has a rectilinear trend, said flow direction S coincides, or is parallel, with the central axis of the duct 7. In the case in which the duct 7 has, precisely in the portion of the same which is struck by the radiation 103, a curvilinear trend according to a curved line, the expression "flow direction S" means the direction tangent to the curved line near the area of the duct 7 struck by the radiation 103.

The term "incident" means that the flow direction S and the irradiation direction R have a common point, that is, they intersect defining an angle greater than 0°.

Preferably the angle of incidence between the flow direction S and the irradiation direction R is substantially equal to 90°.

Advantageously, the duct 7, at least in the portion struck by the radiation 103 emitted by the radiation source 101, is transparent to this radiation 103.

The radiation 103 emitted by the radiation source 101 can be a radiation in the infrared, visible, or ultraviolet spectrum.

The radiation source 101 can comprise a photo-emitting diode 102, as schematically illustrated in FIG. 4, or a laser source.

Advantageously, the radiation source 101 can comprise a collimation optic 112.

Advantageously, the carbonation device 1 comprises a source of carbon dioxide 11 in fluid communication with the carbonation tank 3 and a source of beverage to be gassed 13 in fluid communication with the carbonation tank 3. The carbonation device 1 further comprises a processing and control unit 15 electrically connected to the carbonation sensor 100 configured to receive and process the first electrical signal 106 generated by the first photodiode 105 and the second electrical signal 110 generated by the second photodiode 109. The processing and control unit 15 is further configured to regulate the dispensing of carbon dioxide from the carbon dioxide source 11 to the carbonation tank 3 and/or to regulate the dispensing of the beverage to be gassed from the beverage source to be gassed 13 to the carbonation tank 3 on the basis of said first electrical signal 106 and/or of said second electrical signal 110.

The processing and control unit 15 can therefore be configured to intervene on the carbon dioxide source 11 in order to increase or decrease the dispensing of carbon dioxide inside the carbonation tank 3 as a function of the carbonation degree of the carbonated beverage detected from the carbonation sensor 100.

Advantageously, in fact, the carbon dioxide source 11 comprises a pressure regulator 17 electrically connected to the processing and control unit 15, which unit 15 regulates the dispensing of carbon dioxide inside the tank 3 through said pressure regulator 17, on the basis of the first electrical signal 106 and/or of the second electrical signal 110 detected by the carbonation sensor 100.

For example, if the carbonation sensor 100 detects an undesired decrease in the carbonation degree of the carbonated beverage, the processing and control unit 15 increases, through the pressure regulator 17, the carbon dioxide pressure inside the tank 3, favouring its addition to the beverage to be carbonated.

Vice versa, upon an undesired increase in the carbonation degree, the carbonation device 1 can react by reducing the pressure of carbon dioxide inside the tank 3.

The processing and control unit 15 can also be configured to intervene on the source of beverage to be carbonated 13 in order to increase or decrease the dispensing of said beverage to be carbonated inside the carbonation tank 3 as a function of the carbonation degree of the carbonated beverage detected by the carbonation sensor 100.

Advantageously, in fact, the source of beverage to be carbonated 13 comprises a proportional valve 19 electrically connected to the processing and control unit 15, which regulates the dispensing of the beverage to be gassed inside the tank 3 by means of said proportional valve 19, on the basis of the first electrical signal 106 and/or of the second electrical signal 110 detected by the carbonation sensor 100.

For example, if the carbonation sensor 100 detects an undesired increase in the carbonation degree of the carbonated beverage, the processing and control unit 15 increases, by means of the proportional valve 19, the introduction of the beverage to be carbonated inside the tank 3, consequently diluting the carbon dioxide.

On the other hand, the carbonation device 1 can react to an undesired reduction of the carbonation degree by reducing the introduction of a not yet carbonated beverage into the tank 3.

Advantageously, the regulation of the carbonation degree of the carbonated beverage can be obtained starting from a carbonated beverage with a high carbonation degree, that is, with high values of carbon dioxide pressure inside the tank 3, the desired carbonation degree being obtainable by intervening on the dilution of the carbonated beverage, by means of the proportional valve 19, on the basis of the carbonation degree measured by the carbonation sensor 100.

Advantageously, the carbonation device 1 can also comprise a cavitation device (not shown in the accompanying figures), for example downstream of the carbonation tank 3, whose physical actuation causes a reduction in the carbonation degree of the carbonated beverage. The detection of the carbonation degree of the carbonated beverage by means of the carbonation sensor 100 allows to regulate, through the control and regulation unit 15, the actuation of said cavitation device so as to lower the carbonation degree of the carbonated beverage. Also in this case, therefore, the regulation of the carbonation degree of the carbonated beverage can be obtained starting from a carbonated beverage with a high carbonation degree, which is suitably reduced as a function of the detections made by the carbonation sensor 100 so as to obtain the desired carbonation degree.

Advantageously, the carbonation device 1 can comprise both the pressure regulator 17 and the proportional valve 19. In this way it is possible to control the carbonation level of the carbonated beverage by intervening both on the carbon dioxide source 11 and on the source of beverage to be gassed 13.

Advantageously, the carbonation tank 3 comprises cooling means 21.

Advantageously, the cooling means 21 are electrically connected to the processing and control unit 15, wherein that unit 15 is configured to adjust the temperature of the beverage and carbon dioxide mixture inside the carbonation tank 3.

Advantageously, as illustrated in FIG. 4, the carbonation sensor 100 comprises a casing 113 crossed by the duct 7 and internally housing the radiation source 101, the first photodiode 105, the second photodiode 109 and the processing and control unit 15.

In FIG. 4 the second photodiode 109 is shown in dashed lines meaning that it is placed at a different height with respect to the first photodiode 105.

Advantageously, in addition to the two photodiodes 105 and 109, the radiation source 101 is also electrically connected to the processing and control unit 15.

Advantageously, the processing and control unit 15 is configured to sample the electrical signal generated by the first photodiode 105 and/or the second photodiode 109 at a frequency greater than 8 kHz. In this way the sampled signal retains a significant amount of information. Preferably the sampling frequency is between 30 KHz and 70 KHz, and even more preferably it is about 50 KHz. In this way, the size of the detected data files is kept in an acceptable manner.

Said sampling frequencies are particularly suitable for acquiring the signals produced by the passage of the carbonated beverage along a duct 7 having a diameter between about 5 millimetres and about 10 millimetres.

In fact, in the case of diameters of the duct 7 lower than 5 millimetres, higher sampling frequencies are preferable. Furthermore, the lower the average flow speed of the carbonated beverage in the duct, the lower the sampling frequencies of the signal.

The present disclosure also relates to a carbonation sensor 100 adapted to be associated with a duct 7 where a carbonated beverage flows along a flow direction S.

According to the disclosure, the carbonation sensor 100 comprises:
a radiation source 101 adapted to generate a radiation 103 which strikes said duct 7 along an irradiation direction R incident to the flow direction S;
a first photodiode 105 placed on the irradiation direction R from a side opposite to the radiation source 101 with respect to the duct 7, said first photodiode 105 generating a first electrical signal 106 dependent on the radiation portion 107 which passes through the carbonated beverage which flows along the duct 7, or, as an alternative to said first photodiode 105,
a second photodiode 109 placed along a diffusion direction D substantially orthogonal to the irradiation direction R, said second photodiode 109 generating a second electrical signal 110 dependent on the radiation portion 111 which is diffused by the carbonated beverage along substantially the diffusion direction D.

Advantageously, the carbonation sensor 100 comprises both the first photodiode 105 and the second photodiode 109.

The carbonation sensor 100 can also have one or more of all the technical characteristics already described with reference to the carbonation device 1.

Advantageously, the carbonation sensor 100 is associated with a duct 7 of a carbonation device 1 for beverages as described above.

The carbonation sensor 100 can in any case be associated with any carbonation device, provided that in said carbonation device there is an area where the carbonated beverage can flow, such as for example a duct 7.

As illustrated in FIGS. 11 and 12, the carbonation sensor 100 can be associated with a duct 7 also including the neck of a bottle 27.

In this way it is possible to measure the carbonation degree of a carbonated beverage contained inside the bottle 27, for example when pouring the carbonated beverage into a glass.

Advantageously, the carbonation sensor 100 applicable to the neck of a bottle 27, such as the one schematically illustrated in FIGS. 11 and 12, has a ring configuration around the neck of the bottle 27.

The radiation source 101 and the first photodiode 105 are arranged on diametrically opposite sides of the neck of the bottle 27, along the irradiation direction R, while the second photodiode 109 can be placed along a diffusion direction D substantially orthogonal to the irradiation direction R. The flow direction S is illustrated in FIG. 11 and passes through the neck of the bottle 27.

The variant of the carbonation sensor 100 shown in FIGS. 11 and 12 allows its use also in carbonation devices for home applications, the so-called sparking water makers, where the carbonation tank is in fact constituted by the bottle inside which the beverage is added with carbon dioxide. This makes it possible to read the carbonation degree of the beverage that has been carbonated directly inside the bottle, and it also allows to provide the same carbonator device with a feedback on said carbonation degree, so as to be able to regulate the subsequent carbon dioxide dispensing inside the beverage to be carbonated.

The operation of the carbonation device is described below, with particular reference to some experimental tests performed on it.

The first photodiode 105, aligned with the radiation source 101 along the irradiation direction R, but from the opposite side of the duct 7, detects the shadow caused by the passage of the bubbles present in the carbonated beverage and therefore generates a "photogenerated" current wherein the smaller the bubbles present in the carbonated beverage are, in number and size, the greater the "photogenerated" current is.

For example, in the case in which bubbles, or other particles are completely absent in the carbonated beverage, or in the case in which the duct 7 is dry, the first photodiode 105 is completely struck by the radiation 103 emitted by the source 101 and returns a photogenerated current equal to the maximum value of the photodiode 105 itself. When one or more bubbles shade the photodiode 105, the photogenerated current decreases proportionally to the number and the size of the bubbles passing in front of the photodiode 105.

The second photodiode 109, placed at 90° with respect to the irradiation direction R, instead receives the diffused radiation, along the diffusion direction D, from the bubbles present in the carbonated beverage, and does not receive any direct radiation from the source 101.

Since the second photodiode 109 is positioned so as to capture only the diffused radiation, it is possible to use a very sensitive photodiode, for example by using a very high gain of the operational amplifier associated with the photodiode itself, so that it is possible to detect the passage of even a single small bubble.

The fact of having two photodiodes 105 and 109 arranged orthogonally and capable of capturing portions 107 and 111 of the radiation 103 that are orthogonal to each other allows to realize a carbonation sensor 100 having a very wide measurement interval before incurring the saturation of the electrical signals generated by both photodiodes 105 and 109.

Advantageously, in the case in which the radiation source comprises a laser source and therefore in the case in which the radiation 103 is constituted by a laser light beam, the first photodiode 105 can also be sensitive to the modulation of the laser light beam power due the effect of the so-called self-mixing interferometry. Through the analysis of the so-called "self-mix" signal of the first photodiode 105 it is possible to detect the presence of even very small bubbles, which otherwise would not generate a shadow such that they can be detected by the first photodiode 105 itself in another way. The sensor can therefore also be used to exclude the presence of bubbles in the circuit.

The exploitation of the self-mixing effect by adopting a laser instead of an LED proves to be particularly suitable in the cases in which the carbonation sensor 100 were placed at a duct 7 where the carbonated beverage flows at high pressure, in which therefore the carbon dioxide bubbles are sparser and in any case smaller.

In this case, the carbonation sensor 100 could be suitably calibrated in order to estimate the carbonation degree of the carbonated beverage at the outlet of the dispensing device 5.

Below comments, with particular reference to FIGS. 5 to 10, are made on some tests performed on the carbonation sensor 100.

Figure 5:
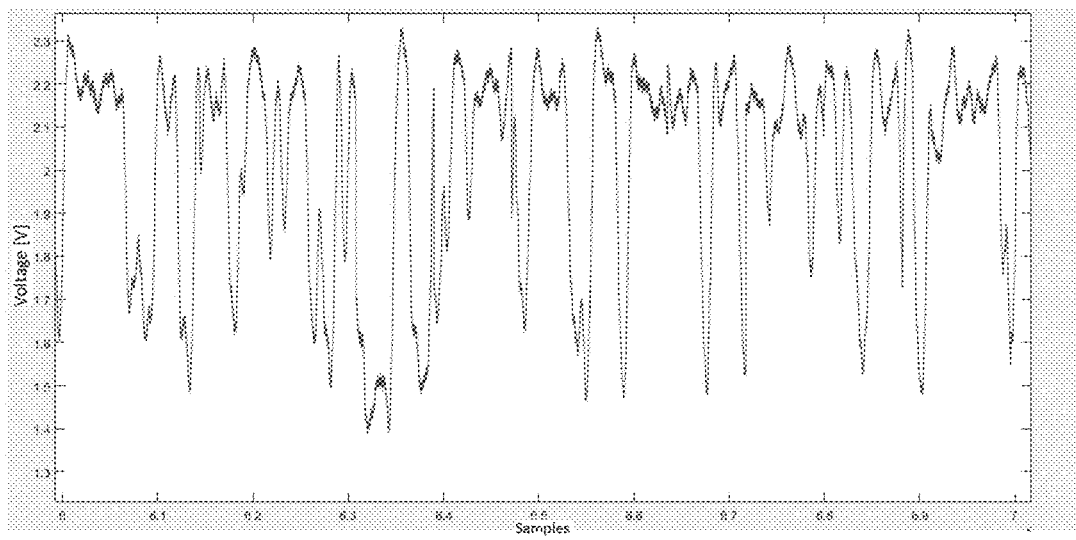
FIG. 5 and FIG. 6 are two graphs of the voltage signal generated respectively by a first photodiode and a second photodiode of the carbonation sensor, during the passage of sparkling water.

The graph of FIG. 5 shows the signal 106 generated by the first photodiode 105 during the passage of carbonated water along the duct 7.

The ordinate shows the voltage in volts of the signal generated by the photodiode in a range from 0 to 5 volts, while the abscissa shows the number of samples of said signal detected at a sampling frequency of 250 KHz.

The voltage signal 106 varies approximately between 1.4 and 2.3 V and shows a plurality of peaks, each broadly associable with the passage of a single carbon dioxide bubble in front of the first photodiode 105.

It should be noted in fact that the duct 7 used in the tests discussed herein has a diameter of a few millimetres, and therefore comparable, within an order of magnitude, with the diameter of the bubbles passing through the carbonated beverage. The ratio between the diameter of the duct and the average diameter of the bubbles is such that, taking into account also the average number of bubbles present in the tested carbonated beverage, in principle the bubbles pass in front of the first photodiode 105 one at a time.

Advantageously, the duct 7 of the dispensing device 5, along which the carbonated beverage flows, near the dispensing point to the container 9 has a diameter of a few millimetres, preferably less than 15 millimetres, even more preferably less than 10 millimetres.

Figure 6:
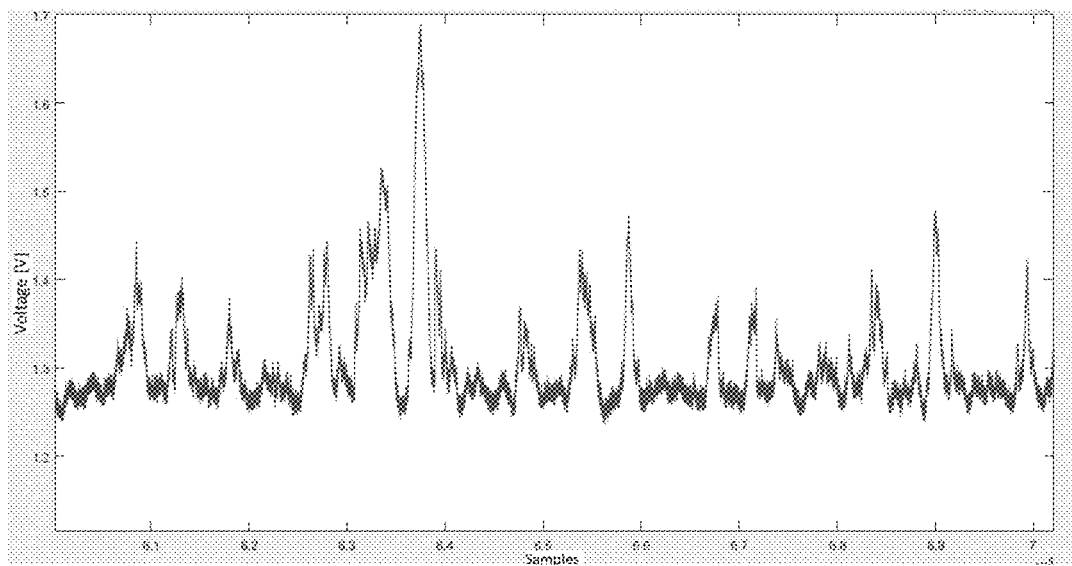

FIG. 6 shows the signal 110 generated by the second photodiode 109 during the passage of carbonated water along the duct 7 under the same measurement conditions described with reference to FIG. 5.

In this case the voltage signal varies approximately between 1.25 and 1.7 V.

Also in this case the peaks present in the signal can be associated with the passage of the single bubbles which diffuse the radiation towards the second photodiode 109.

Figure 7:
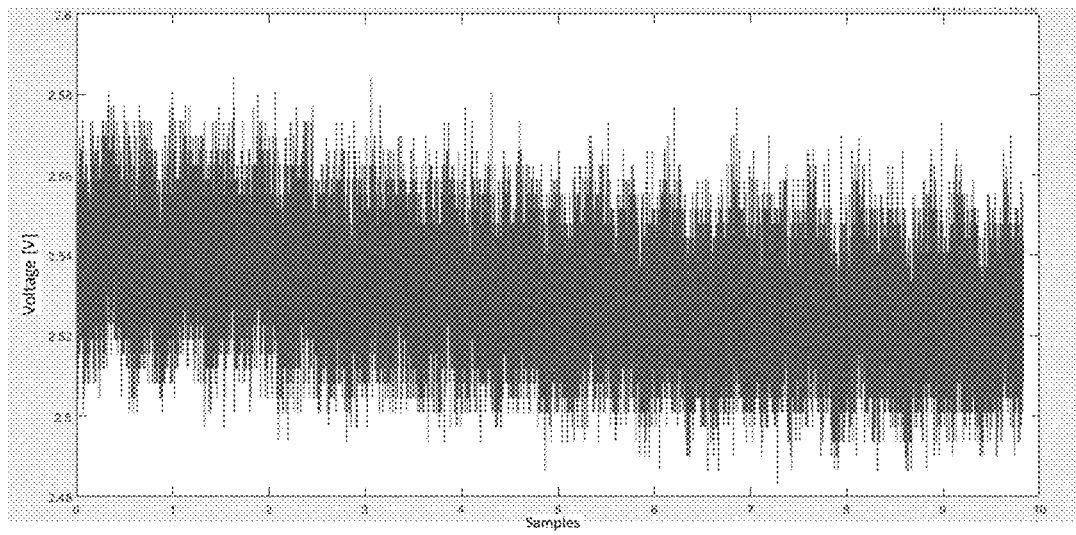
FIG. 7 and FIG. 8 are two graphs of the voltage signal generated respectively by a first photodiode and a second photodiode of the carbonation sensor, during the passage of still water.

FIG. 7 shows the signal 106 generated by the first photodiode 105 during the passage of still water along the duct 7.

Figure 8:
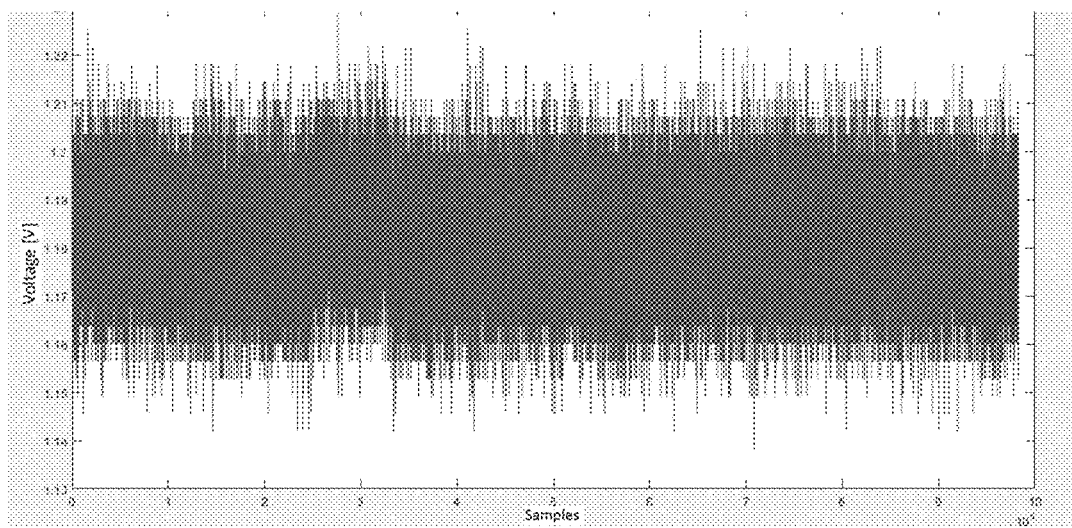

FIG. 8 shows the signal 110 generated by the second photodiode 109 during the passage of carbonated water along the duct 7 under the same measurement conditions described with reference to FIG. 7.

In both measurements with still water, it is immediately evident that the voltage signal varies approximately between 2.50 and 2.58 V and between 1.14 and 1.22 V, respectively.

In essence, the amplitude of the variation of the voltage signal detected by the photodiodes 105 and 109 is dependent on the amount of bubbles passing at the photodiodes themselves.

Figure 9:
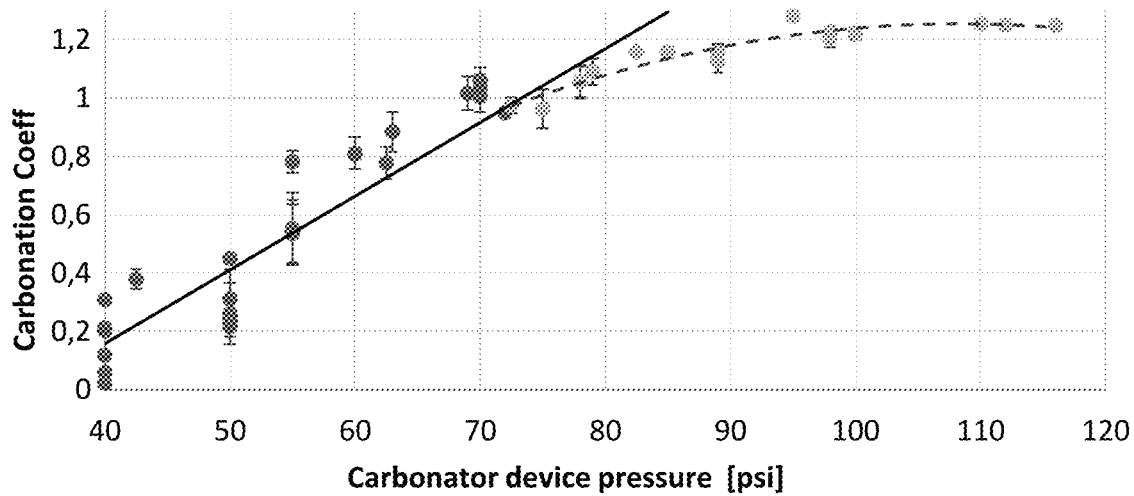
FIG. 9 and FIG. 10 are two graphs of the trend of the carbonation coefficient as a function of the pressure of carbon dioxide, a coefficient obtained starting from the voltage signal generated respectively by a first photodiode and a second photodiode of the carbonation sensor, during the passage of water having different carbonation degrees.
Figure 10:
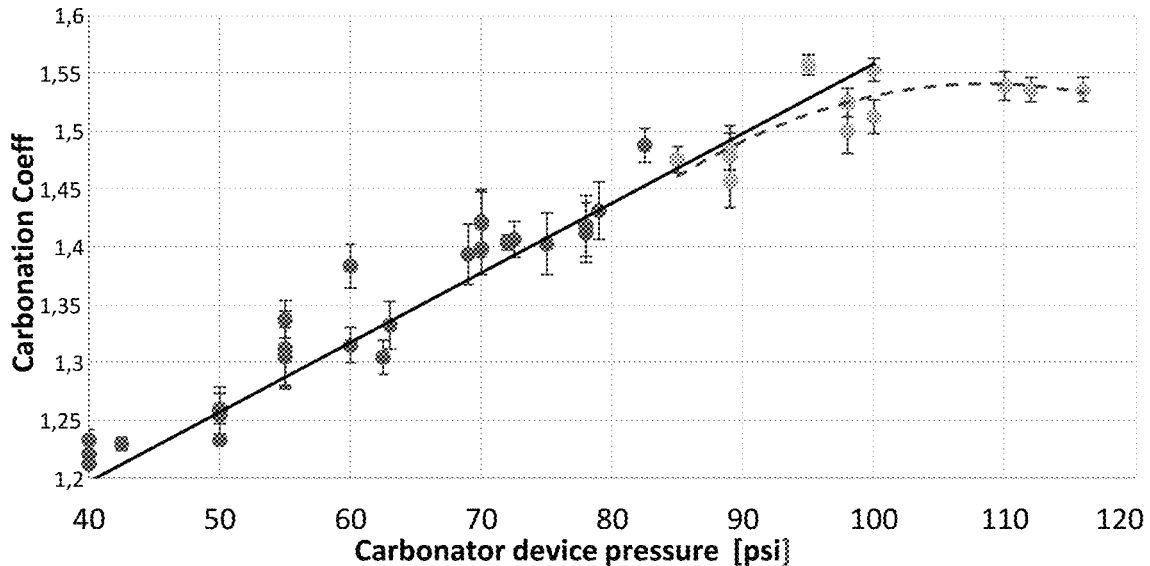

FIGS. 9 and 10 show the results of a second experiment, briefly described below.

The carbonation sensor 100 has been used to detect bubbles present in water added with increasing amounts of carbon dioxide.

In particular, a carbonation device was used, equipped with a pressure regulator which made it possible to regulate the pressure of carbon dioxide inside the carbonation tank and therefore, under equal other conditions, such as temperature, to regulate the amount of carbon dioxide dissolved in water.

Various acquisitions of the signals generated by the two photodiodes 105 and 109 were therefore performed as the carbon dioxide pressure of the carbonation tank changed.

For each acquisition and for each photodiode it is possible to calculate a so-called carbonation coefficient, obtained for example by integrating the voltage signal and by normalizing it with respect to the duration of the acquisition.

Specifically, the carbonation coefficient as shown in FIGS. 9 and 10 was obtained by performing a mean of the value of the acquired signal (i.e., sum of the values of the single samples divided by the number of samples).

The simple mean of the signal is a good approximation of the measurement of the carbonation degree.

Advantageously, it is possible to perform more complex signal processing, for example capable of taking into account the non-linear function of the amplitudes of the shadow (as regards the first photodiode 105) or the extent of the diffusion (as regards the second photodiode 109) based on the volume of the bubbles. For example, as explained further on, bubbles with a large diameter, for example greater than 1 mm, are crossed, in their central part, by the radiation 103, and therefore in the centre of the same they do not in fact make any shadow.

FIG. 9 shows the carbonation coefficients calculated on the basis of the signal of the first photodiode 105, and therefore referable to the "shadow" effect of the passage of the water bubbles in front of the photodiode 105.

FIG. 10 shows the carbonation coefficients calculated on the basis of the signal of the second photodiode 109, and therefore referable to the "diffusion" effect of the passage of the water bubbles in front of the photodiode 109.

With reference to the results shown in FIG. 9, it should be noted that as the carbonation pressure increases, the carbonation coefficient also increases.

Said increase follows a linear trend up to about 80 psi of pressure, while the photodiode 105 tends to saturate beyond 80 psi.

This effect is due to the fact that as the carbon dioxide pressure increases, the number and size of the bubbles passing in front of the photodiode 105 increases, which photodiode therefore does not manage to identify the single bubbles any more. Consequently, the respective peaks join together and there is a loss of information which precisely causes the saturation of the signal 106 of the photodiode 105.

It should be noted that the measurements of the carbonation coefficient deviate from each other at 40 psi because of the fact that at low pressures the pressure regulator is not precise enough. In fact, at higher pressures the measurements increase significantly in repeatability.

FIG. 10 shows the measurements made by the second photodiode 109.

In this case, the increase in the carbonation coefficient detected follows a linear trend up to about 100 psi, after which, as in the case of the first photodiode 105, the signal 110 reaches saturation.

By means of a suitable calibration, it is possible to calibrate the two photodiodes 105 and 109 so that the carbonation coefficient detected by the two photodiodes substantially corresponds.

The carbonation sensor 100 is adapted to detect the passage of bubbles in the carbonated beverage. Generally, since the only gas present inside the carbonation tank 3 should be carbon dioxide, it is assumed that when the carbonated beverage is placed at ambient pressure, the bubbles that form inside it are bubbles of carbon dioxide. Therefore the detection of the amount and the size of the bubbles also acts as an estimate of the carbon dioxide present in the carbonated beverage.

The carbonation sensor 100 is capable of detecting the passage of bubbles, not only of carbon dioxide, but possibly also of other gases, such as oxygen or nitrogen, but also the passage of various types of particles possibly present in the carbonated beverage, such as example contaminant particles, or microplastics.

In fact, during the passage of a gas bubble there is a change in the refractive index of the radiation as a function of the subsequent crossing of the liquid-gas and gas-liquid interfaces which leads to the generation of an electrical signal from the photodiodes 105 and/or 109 that is different from the electric signal generated by the passage of a particle, as a result of the different change in the refractive index due to the crossing of the liquid-solid and solid-liquid interfaces and because the solid particles can be opaque and therefore further attenuate the radiation and exhibit a different diffusion.

Therefore, it is possible to distinguish the two phenomena by analysing the signal generated by the photodiodes 105 and/or 109.

Furthermore, in order to make the carbonation sensor 100 specifically sensitive to the passage of carbon dioxide bubbles, it is possible to select a radiation source 101 which comprises a pair of radiation sources centred on two different wavelengths, alternately pulsed, and close between them so as to generate, at the passage of a bubble, substantially the same shadow and the same diffusion. In this way, considering the different absorption attributable to different gases, the ratio between the measurements made by the first photodiode 105 at the two different wavelengths allows to distinguish the bubbles of a specific gas, such as carbon dioxide, from the bubbles of other gases.

For example, as to the carbon dioxide, which has an absorption peak at 1400 nm, it is possible to use a 1400 nm LED and a 1200 nm LED. Pulse synchronous acquisitions can then be made and the ratio between the two average values measured, so as to distinguish the carbon dioxide bubbles from other bubbles.

Advantageously, the signal 106 generated by the first photodiode 105 can be suitably processed, for example by autocorrelation, so as to estimate the size of the bubbles passing in front of the photodiode itself.

In fact, the bubble acts as a sort of lens for the radiation 103 that strikes it, leaving a sort of imprint on the photodiode 105.

In particular in the case of larger bubbles, the radiation 103 is deflected by the edges of the bubble itself, which therefore shade the photodiode 105, but passes through the centre of the bubble, thus reaching the photodiode 105.

With algorithms that are capable of distinguishing and recognizing specific patterns of alternation of lights and shadows it is therefore possible to indirectly measure the size of the bubbles that pass in front of the photodiode 105.

Advantageously, the carbonation sensor 100 can comprise one or more further photodiodes placed flanked by the first photodiode 105 along a direction parallel to the flow direction S of the beverage in the duct 7, which photodiodes are arranged so as to detect in any case the radiation 103 emitted by the radiation source 101.

In this way, being the distance between the photodiodes placed along said direction known, the cross-correlation over time of the signals detected by said photodiodes allows to identify precisely the same one event over time, such as for example the passage of a carbon dioxide bubble, and therefore to obtain the flow speed of the carbonated beverage inside the duct 7.

The presence of further photodiodes, flanked both by the first photodiode 105 and the second photodiode 109 along directions parallel to the flow direction S advantageously allows to make more accurate and more robust measurements.

The carbonation device 1 advantageously also comprises a temperature sensor 23 and/or a pressure sensor 25, the measurements of which can be integrated with those obtained by the carbonation sensor 100 for a further more accurate measurement of the carbonation degree of the carbonated beverage.

Advantageously, the temperature sensor 23 and/or the pressure sensor 25 are connected to the processing and control unit 15.

Preferably the carbonation device 1 comprises a temperature sensor 23 located near the carbonation sensor 100, for example therefore near the dispensing point of the carbonated beverage.

Monitoring the temperature of the carbonated beverage near the carbonation sensor 100 in fact makes it possible to correlate the variation in the carbonation degree of the beverage detected by the carbonation sensor 100 with the temperature variation of the carbonated beverage, according to the gas law PV=nRT.

The carbonation device 1 can also comprise a pressure sensor 25.

Advantageously, the pressure sensor 25 allows to know the pressure in the duct 7, or inside other ducts of the carbonation device 1, so as to be able to define more accurate algorithms for detecting the carbonation degree and which are not dependent on the flow rates of the carbonated beverage.

Advantageously, the pressure sensor 25 also allows correlating the variation in the carbonation degree of the beverage detected by the carbonation sensor 100 when the pressure of the carbonated beverage inside the ducts of the carbonation device 1, according to the gas law PV=nRT, varies.

Since it is at atmospheric pressure near the dispensing point of the carbonated beverage, the pressure sensor 25 is preferably placed at the ducts of the carbonation device 1 where the carbonated beverage flows under conditions of pressure greater than the atmospheric pressure.

The present disclosure also relates to a process for measuring the carbonation of a carbonated beverage by means of the carbonation sensor 100 as described above, and a process for measuring the carbonation of a carbonated beverage in a carbonation device for beverages as described above.

According to the disclosure, said process comprises at least a step of detecting the first electrical signal 106 generated by the first photodiode 105 and/or the second electric signal 110 generated by the second photodiode 109, and a step of processing said first electrical signal 106 and/or said second electrical signal 110 to obtain a measurement of the amount of carbon dioxide contained in the carbon dioxide bubbles present in a volume of said carbonated beverage, and in particular in the volume of carbonated water which in a given period of time flows through the duct 7.

In this way it is possible to provide an indication of the total amount of carbon dioxide present in the carbon dioxide bubbles that are present in the carbonated beverage.

Advantageously, the aforesaid process can also comprise the step of detecting the first electric signal 106 generated by the first photodiode 105 and the step of processing said first electric signal 106 to obtain a measurement of the size of a bubble that passes in front of said first photodiode 105.

Advantageously, the aforesaid process can also comprise the step of calculating the probability density function (PDF) of the distribution of bubbles as a function of the size of the bubbles themselves, for example as a function of their diameter. In this way it is possible to obtain an indication of the degree of stability of the beverage. In fact, smaller bubbles tend to coalescence with larger bubbles, thus favouring the dispersion of the gas trapped in the bubbles. On the contrary, the uniform presence of small bubbles gives greater stability to the carbonated beverage, even with the same levels of carbon dioxide.

Advantageously therefore the carbonation sensor 100 allows to monitor the stability of the carbonated beverage thanks to the possibility of monitoring the PDF of the distribution of the bubbles.

Advantageously, the carbonation device 100 is adapted to obtain the carbonation of alcoholic beverages which provide for the addition of carbon dioxide. In particular, the carbonation device 100 is adapted to obtain the carbonation of beers by adding a mixture of carbon dioxide and nitrogen, and possibly further gases.

In fact, there are beers in which carbon dioxide is not obtained, or is only partially obtained, from fermentation phenomena.

Advantageously, in the case of beer carbonation, the carbonation tank 3 can be the keg itself containing the beer.

In this case, the carbonation device 1 can also comprise a nitrogen source, not shown in the accompanying figures, in fluid communication with the carbonation tank 3, preferably by means of a further pressure regulator, connected to the processing and control unit 15.

The carbonation sensor 100, being able to detect the presence also of nitrogen, as well as carbon dioxide, bubbles advantageously allows to also regulate the introduction of nitrogen inside the carbonation tank, for example by intervening on the aforesaid pressure regulator, so as to guarantee that the correct amount of both carbon dioxide and nitrogen is sent to the carbonation tank 3 to be dissolved in the beer contained therein.

In practice it has been found that the carbonation device for beverages, as well as the relative carbonation sensor, according to the present disclosure, fulfil the intended task and advantages as they allow to detect the carbonation degree of a carbonated beverage in a simple, robust and cheap way.

Another advantage of the carbonation device, according to the disclosure, is the fact that the relative carbonation sensor is capable of directly monitoring the carbonation degree of the carbonated beverage at the time of dispensing of the same, i.e. when the carbonated beverage is placed at atmospheric pressure and carbon dioxide bubbles are formed.

A further advantage of the carbonation device, according to the disclosure, is the fact that the relative carbonation sensor is capable of estimating the amount of carbon dioxide present in a carbonated beverage in the form of bubbles. In fact, the presence of carbon dioxide dissolved in a beverage not only determines the particular perception for the user, but also how this carbon dioxide contributes to the formation of bubbles when the beverage passes to atmospheric pressure.

Another advantage of the carbonation device, according to the disclosure, is being able to perform, thanks to the presence of the carbonation sensor, an automatic in-line calibration of the device itself, without resorting to external equipment.

Still another advantage is drastically reducing the maintenance interventions on the carbonation device.

A further advantage of the carbonation device, according to the disclosure, is the fact that it is possible to regulate and vary the desired carbonation degree of the carbonated beverage, both to maintain said degree constant even when external environmental conditions vary (e.g., temperature increase), and to vary the carbonation degree, for example based on the type of beverage to be carbonated.

A further advantage of the carbonation device, according to the disclosure, is the fact that it is possible to vary and regulate the carbonation degree of the carbonated beverage also during the single dispensing.

Still another advantage of the disclosure is the fact that the carbonation sensor does not require a direct contact with the carbonated beverage, since it is sufficient for it to pass through a duct that is at least partially transparent.

Still another advantage of the carbonation sensor according to the disclosure is the fact that it does not have moving parts which tend to reduce the performance of the sensor itself over time.

Still another advantage is the fact that the carbonation sensor is absolutely inexpensive, and therefore usable on a large scale in any type of application and context, since it includes substantially low-cost and large-consumption diodes or photodiodes.

Still another advantage is the fact that the carbonation sensor has a good sensitivity and a very high response speed.

Still another advantage of the carbonation sensor according to the disclosure is the fact that it also detects the presence of contaminating particles in the beverage, both when applied to a carbonation device and when applied to the neck of a bottle.

The carbonation device and the carbonation sensor thus conceived are susceptible of numerous modifications and variations, all of which are within the scope of the inventive concept.

Furthermore, all the details can be replaced by other technically equivalent elements.

In practice, any materials can be used according to requirements, as long as they are compatible with the specific use, the dimensions and the contingent shapes.

The invention claimed is:

1. A carbonation device for beverages, comprising a carbonation tank adapted to receive a beverage to be carbonated and carbon dioxide so as to generate a carbonated beverage, carbonated with said carbon dioxide, and a dispensing device in fluid communication with said carbonation tank and adapted to dispense, through a duct, said carbonated beverage to a container for carbonated beverages, said carbonated beverage flowing along said duct in a flow direction, wherein the carbonation device comprises a carbonation sensor associated with said duct, said carbonation sensor comprising a radiation source adapted to generate a radiation which strikes said duct along an irradiation direction incident to said flow direction, said carbonation sensor further comprising:
   a first photodiode placed on said irradiation direction from a side opposite to said radiation source with respect to said duct, said first photodiode generating a first electrical signal dependent on the radiation portion which passes through said carbonated beverage which flows along said duct, or
   a second photodiode placed along a diffusion direction substantially orthogonal to said irradiation direction, said second photodiode generating a second electrical signal dependent on the radiation portion which is diffused by said carbonated beverage along substantially said diffusion direction,
   wherein the carbonation device comprises a source of carbon dioxide in fluid communication with said carbonation tank and a source of beverage to be gassed in fluid communication with said carbonation tank, said carbonation device comprising a processing and control unit connected to said carbonation sensor so as to receive and process said first electrical signal generated by said first photodiode and/or said second electrical signal generated by said second photodiode, said processing and control unit being configured to regulate the dispensing of said carbon dioxide from said carbon dioxide source to said carbonation tank and/or to regulate the dispensing of said beverage to be gassed from said beverage source to be gassed, to said carbonation tank on the basis of said first electrical signal and/or of said second electrical signal.

2. The carbonation device for beverages according to claim 1, wherein said carbonation sensor comprises both said first photodiode and said second photodiode.

3. The carbonation device for beverages according to claim 1, wherein said carbon dioxide source comprises a pressure regulator connected to said processing and control unit, said processing and control unit being configured to regulate the dispensing of said carbon dioxide through said pressure regulator, on the basis of said first electrical signal and/or of said second electrical signal.

4. The carbonation device for beverages, according to claim 1, wherein said source of beverage to be gassed comprises a proportional valve connected to said processing and control unit, said processing and control unit being configured to regulate the dispensing of said beverage to be gassed by means of said proportional valve, on the basis of said first electrical signal and/or of said second electrical signal.

5. The carbonation device for beverages according to claim 1, wherein said carbonation sensor comprises a casing crossed by said duct and internally housing said radiation source, said first photodiode, said second photodiode and said processing and control unit.

6. The carbonation device for beverages according to claim 1, wherein said radiation source comprises a laser source, said radiation comprising a laser light beam, said first photodiode detecting the modulation of the power of said laser light beam caused by a retro-injection interferometry effect.

7. The carbonation device for beverages according to claim 1, wherein said carbonation tank comprises a cooling component electrically connected to said processing and control unit, said processing and control unit being configured to adjust the temperature of said carbonation tank through said cooling component.

8. The carbonation device for beverages according to claim 1, further comprising a temperature sensor and/or a pressure sensor connected to said processing and control unit.

9. The carbonation device for beverages according to claim 1, wherein said processing and control unit is configured to sample the electrical signal generated by said first photodiode and/or by said second photodiode at a frequency greater than 8 kHz.

* * * * *